United States Patent [19]
Harter et al.

[11] 3,732,010
[45] May 8, 1973

[54] PAPER ADVANCE AND MARKING MECHANISMS FOR PHOTOGRAPHIC PRINTING APPARATUS

[75] Inventors: James E. Harter; John E. Morse, both of Rochester, N.Y.

[73] Assignee: Eastman Kodak Company, Rochester, N.Y.

[22] Filed: Sept. 20, 1971

[21] Appl. No.: 181,685

[52] U.S. Cl. ...................355/64, 355/74, 355/77
[51] Int. Cl. ......................G03b 27/32, G03b 27/52
[58] Field of Search.....................355/50, 54, 46, 64, 355/72, 74, 77

[56] References Cited

UNITED STATES PATENTS

3,253,503   5/1966   Hayden et al......................355/74 X
3,421,817   1/1969   Schwardt...........................355/74 X Primary Examiner—Samuel S. Matthews
Assistant Examiner—Richard A. Wintercorn
Attorney—W. H. J. Kline et al.

[57] ABSTRACT

Photographic printing apparatus capable of making varying sizes of prints corresponding to varying magnifications utilizes a two stage printing paper advance mechanism continually referenced to horizontal and vertical optical center lines whereby the sequential exposures of varying size are contiguous thereby effecting economic utilization of print paper. The two stage paper advance also permits simplified marking of the print paper for subsequent cutting operations.

10 Claims, 9 Drawing Figures

PATENTED MAY 8 1973 3,732,010

JAMES E. HARTER
JOHN E. MORSE
INVENTORS

BY Cyril A Krenzer
W/H J Kline
ATTORNEYS

FIG. 3

JAMES E. HARTER
JOHN E. MORSE
INVENTORS

PATENTED MAY 8 1973 3,732,010

JAMES E. HARTER
JOHN E. MORSE
INVENTORS

BY Cyril A Krenzer
W. H. J. Kline
ATTORNEYS

JAMES E. HARTER
JOHN E. MORSE
INVENTORS

ATTORNEYS

PAPER ADVANCE AND MARKING MECHANISMS FOR PHOTOGRAPHIC PRINTING APPARATUS

CROSS-REFERENCE TO RELATED APPLICATIONS

Reference is hereby made to commonly assigned, copending U.S. Pat. application No. 181,686, entitled PRINT BORDER CONTROL APPARATUS, filed in the names of James E. Harter and Normal J. Rosenburgh on Sept. 20, 1971.

BACKGROUND OF THE INVENTION

This invention relates generally to printing apparatus and more particularly to improved mechanisms for use in photographic printing apparatus.

In the professional, commercial, and industrial photographic printing industry. It is desirable to have printers which handle several widths of paper and which produce prints of various sizes. It is also desirable to have a printer which is relatively automatic to set up for various print sizes and which will carry an identifying mark to facilitate the cutting of the prints of the various sizes after the print roll has been exposed. It is also desirable to have a printer which is relatively easy to use and which effects economy in the use of the print paper. For example, once an operator has composed a picture as he desires it, it is desirable just to set the masking borders for the print without any further manipulation of the apparatus on the part of the operator. This both minimizes the change of error and also speeds up the overall printing process.

It is also desirable when using print rolls to place cut marks located in some precise relation to the leading or the trailing edge of each print exposed on the roll. A marking device is usually mounted in the platen of the exposure gate and its marks on the paper roll are later sensed by a photoelectric or reflective pick-up to actuate a cutting device which cuts the finished print from the roll. However, printers which handle several widths of paper and prints of various lengths pose a very difficult problem in placing cut marks accurately on the paper. One solution to the problem is to make the marker itself adjustable so that as print lengths change, the marker will also be varied in position in the apparatus. This is somewhat undesirable since it requires relatively accurate controls placed on the marking apparatus to assure that the mark produced thereby always is in an accurate fixed relation to the leading or trailing edge of the print. Moreover, with both varying widths and lengths, it would be necessary to remove a substantial area of the platen to accomodate the marker.

OBJECTS AND SUMMARY OF THE INVENTION

Accordingly, it is an object of this invention to provide an improved photographic printing apparatus which overcomes the foregoing disadvantages of the prior art systems.

Another object of the invention is to provide an improved paper advance mechanism which greatly facilitates the use of the apparatus with different paper widths and produces different print sizes.

Yet another object of the invention in conjunction with the improved paper advance mechanism is to provide a print mark system which simply and accurately locates a cut mark on the photographic print paper in precision relation to the leading or trailing edge of the photographic print.

According to one aspect of the invention, at least one optical center line as determined by the projection system on the print area is established and maintained fixed. All other elements of the print control are varied relative to the established and accurate reference of the optical center line. A two stage paper advance mechanism is used which always places the center of the print area to be exposed on the optical center line for exposure purposes and places the trailing edge of the exposed print on the optical center line subsequent to exposure to facilitate marking thereof. The print marking always occurs after the second stage advance has placed the trailing edge of the exposed print on the optical center line or conversely, and being the same in essence, the mark is placed on the print paper before the first stage of the paper advance at which time the leading edge of the print area to be exposed is positioned on the optical center line.

DESCRIPTION OF THE PREFERRED EMBODIMENT

Figure 1:
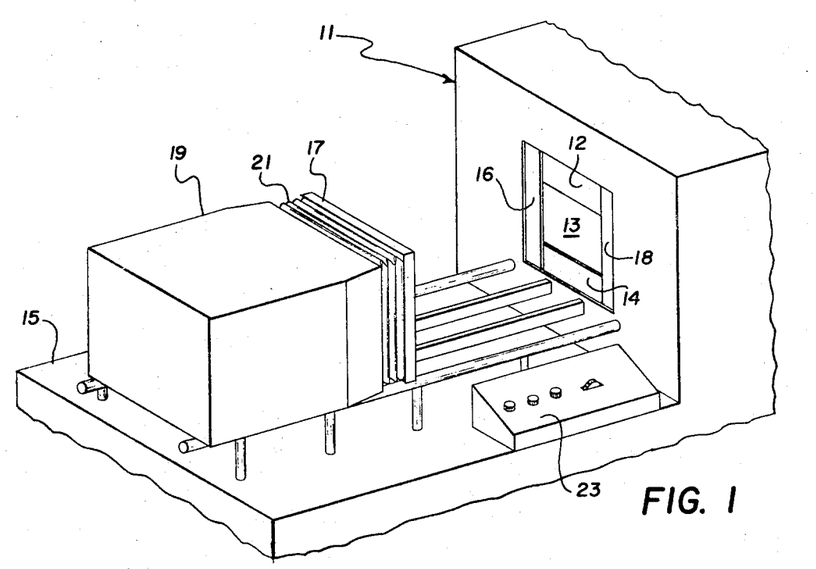
FIG. 1 is a perspective view of a photographic printer in which the invention finds utility.

Referring now to FIG. 1, the printing apparatus therein shown includes a cabinet 11 which includes within it the paper drive mechanism along with the paper supply and take-up rolls. In the front of the cabinet is a composing screen 13 which, while not shown, is movably mounted and when lowered would reveal the print paper to be exposed within a border control area as determined by horizontal masks 12 and 14, and vertical masks 16 and 18. Attached to the front of the cabinet 11 is a carriage guide 15 upon which is mounted the lens carriage 17 and the transparency holder and light source 19 which is connected to the lens carriage by a light-tight baffle 21. A control panel 23 may be located adjacent to the carriage guide. In the general operation of such a system, light from the source 19 passes through the transparency and through the lens contained in the lens carriage 17 and is focused on the composing screen 13. The operator will set the magnification desired and in general compose the picture to include, of course, proper focusing and then will set the controls required to expose the desired number of prints. Subsequently, the screen 13 is removed from in front of the cabinet 11 and the light from the light source 19 is illuminated for a period of time to affect exposure of the print paper which is in the position behind the area formerly occupied by the composing screen 13. Subsequent exposures are made by suitably advancing the print paper through the opening in the cabinet 11 in accordance with techniques to be later described.

Figure 2:
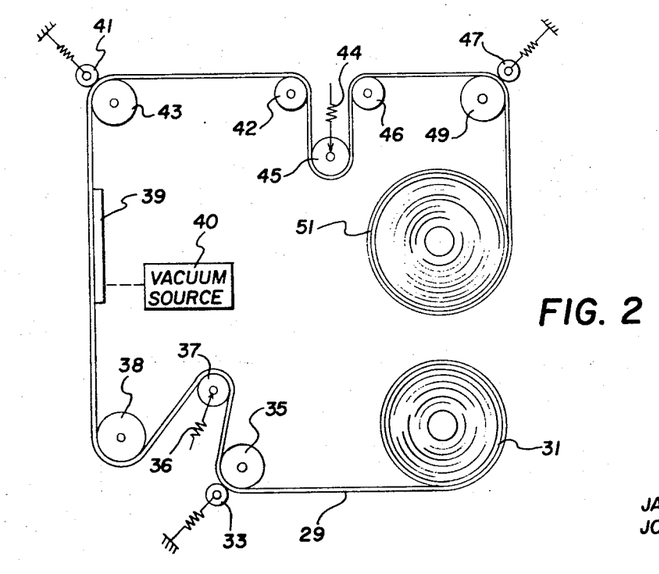
FIG. 2 is a schematic representation of a print paper supply and take-up system used in the present invention.

Referring next to FIG. 2, there is shown diagrammatically a side view of a paper supply and take-up system which could be used in accordance with the present invention. The paper 29 is taken from the supply spool 31 passed between a first castored and gimbled pressure roller 33 and a drive roller 35. Paper is then fed over supply loop 37 in front of a vacuum platen 39 and passes between a second pressure roller 41 and a second drive roller 43. Since the present system is described in the context of horizontally disposed printing apparatus, the vacuum platen 39 is required, or at least desired, to maintain the print paper flat against the platen during the exposure process. After passing between the drive roller 43 and the pressure roller 41, the paper 29 is passed around a take-up loop 45 and between a third pressure roller 47 and a third drive roller 49 to the take-up spool 51.

Figure 3:
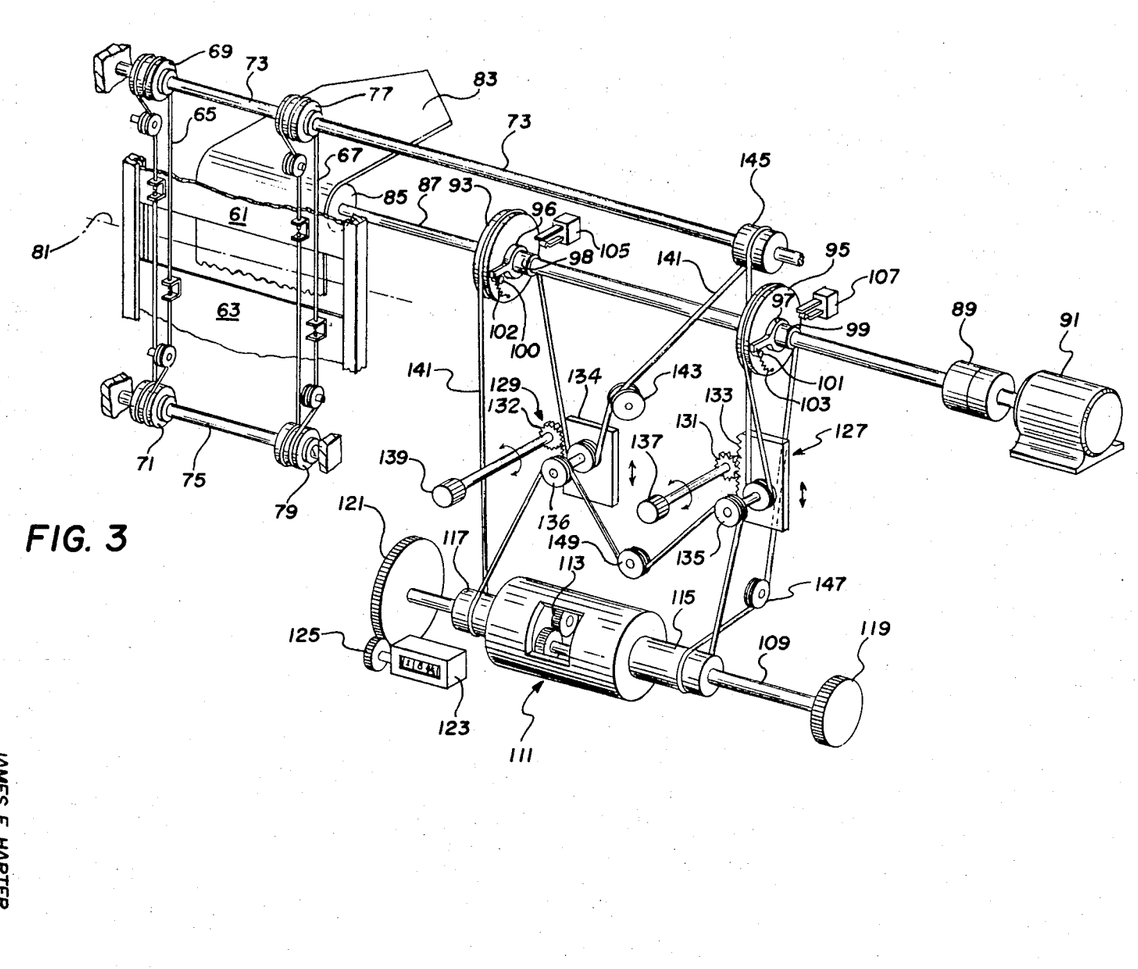
FIG. 3 is a segmental view in perspective of one embodiment of a two stage print paper advance and control apparatus according to the present invention.

The mechanism shown functionally in FIG. 3, and spread out somewhat for clarity of detail, operates to control the vertical mask opening and vertical paper advance of the printing apparatus. The masks 61 and 63 are slidably mounted on suitable rails and are driven by cables 65 and 67, cable 65 passing over a first roller 69 and a second roller 71 fixedly mounted to shafts 73 and 75, respectively. Similarly, cable 67 passes around rollers 77 and 79, affixed to the shaft 73 and 75, respectively. The cables are connected on each side to both the top mask 61 and the bottom mask 63, in a manner such that a clockwise rotation of the shaft 73, the space between masks to open and a counterclockwise rotation of the shaft 73 causes the space between the mask to close. Centered on the opening between the two masks 61 and 63, is the horizontal optical center line 81 of the printing apparatus and as will become apparent in the ensuing description, the optical center lines are absolute references for the paper advance control.

The print paper 83 is advanced by means of a drum 85 mounted on a shaft 87. The shaft 87 is driven by a motor 91 which is connected thereto by a brake/clutch 89. Mounted on the shaft 87 for relative rotation with respect thereto are two drum advance mechanisms 93 and 95. Mounted adjacent to each drum advance mechanism on the shaft 87 is a rotatable arm 96,97, which is connectable to a clutch mechanism 98,99 which may be, for example, a magnetic clutch. Mounted on each of the drum mechanisms 93 and 95 is a stop member 100,101. The arms 96,97 are maintained in contact with the stops 100,101 by biasing springs 102,103. Suitably mounted in association with the drum advance mechanism are switches 105,107 adapted to be contacted by the arms 96,97 when arms rotate about the shaft 87 to energize the brake/clutch 89, turn off motor 91 and release the clutches 98,99.

Spaced from shaft 87 is a shaft 109 has mounted thereon a differential 111 which includes gears 113 integral with drums 115 and 117 on each side thereof. The gears 113 may be, for example, a spider and planetary gears. The differential 111 with its associated drums 115 and 117 is operative in a manner such that initial motion by the turning of the knob 119 will impart uniform motion in the same angular direction to the drums 115 and 117. However, if the initial motion is imparted to one of the drums 115 or 117 in a given angular direction, the opposite angular motion will result via the gears 113 to the other of the drums 117 or 115. At one end of the shaft 109 which is mounted a calibration gear 121. The calibration gear is connected to a counter indicator 123 via a gear 125. Interposed between the shaft 109 and the shaft 87 are a pair of gear mechanisms 127 and 129 which are operative to control the borders of the print area. Each of the mechanisms includes a pinion gear 131 which engages with a rack gear 133 which is affixed to a slide device 135 having two pulleys mounted thereon. As fully described in the aforementioned copending U.S. Pat. application No. 181,686 knob 137 operates on the gear mechanism 127 to control the top border of the exposure to be made while the knob 139 operates gear mechanism 129 to control the bottom border of the exposure to be made.

A cable 141 interconnects the various shafts in the following manner: beginning with the drum 117, the cable passes up and over the drum 93, down and around a first pulley on the gear mechanism 129, up and over a guide 143, to a drum 145 on the shaft 73. After proceeding around the drum 145 on the shaft 143, the cable proceeds down around a first pulley on the gear mechanism 127, then up and around the drum 95, down around a guide 147, over to and around the drum 115 on the shaft 109. From there the cable proceeds up and around a second pulley on a gear mechanism 127 and down and around a guide 149 and up to a second pulley on gear mechanism 129 and back to the drum 117 on the shaft 109. Absent any external forces the drums 93 and 95 on the shaft 87 would be free to rotate either therewith or thereabout. However, the cable 141 holds the drums 93 and 95 in a fixed position about the shaft.

In operation, the mask spacing is first established by adjusting the control knob 119. For example, it can be seen that as the control knob is turned in a clockwise direction, then through the action of the differential mechanism 111 and the cable 141, the shaft 73 through the movement of the drum 145 will also be rotated in a clockwise direction. This in turn rotates the drums 69 and 77 in a clockwise direction, which increases the opening between the edges of the masks 61 and 63. Conversely, to close the opening between the masks, the knob 119 is rotated in a counterclockwise direction.

As the mask spacing is established by the control of the knob 119, it can also be seen that the drums 93 and 95 have motion imparted to them via the cable 141, the motion of these drums being opposite to the angular motion of the shaft 109. As the drums 93 and 95 rotate counterclockwise, the distance between the stops 100,101 and the switches 105,107 increases, so that when either of the magnetic clutches 98,99 is energized, it will travel through a larger angle. This is equivalent to a larger rotation of the drum 85 mounted on the shaft 87, the drum 85 imparting vertical motion to the print paper 83. The diameters of the drums 93 and 95 are calibrated to relate the rotation of the drum 85 to the opening between the masks 61 and 63. In a preferred mode of operation, the angular displacement between the arms 96,97 biased to the stops 100,101 by the springs 102,103 and the switches 105,107 corresponds to one-half of the print length in the vertical direction. Thus, energization of the motor 91 rotates the shaft 87 clockwise until one of the arms 96,97 contacts its respective switch 105,107. At this point the brake/clutch 89 is energized to stop the motor 91 and the arm is released from its clutch mechanism 98,99 and returns to its stop 100,101. The rotation of the shaft 87 during this operation has advanced the print paper one-half of the print width.

Figure 4A:
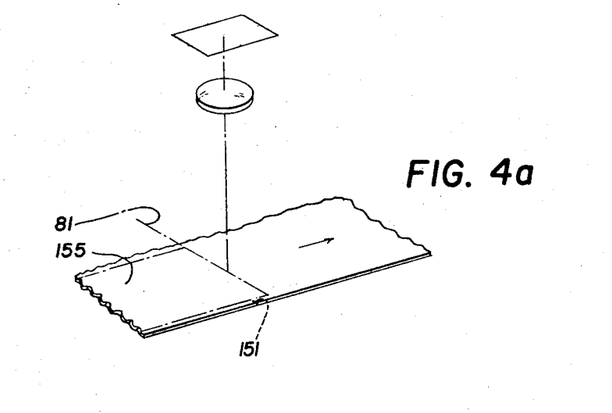
FIGS. 4A, B and C are diagrammatic representations of the print paper as it progresses through the apparatus of the invention.
Figure 4B:
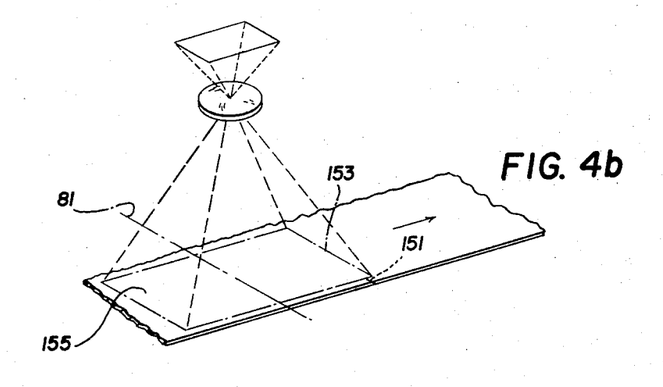
Figure 4C:
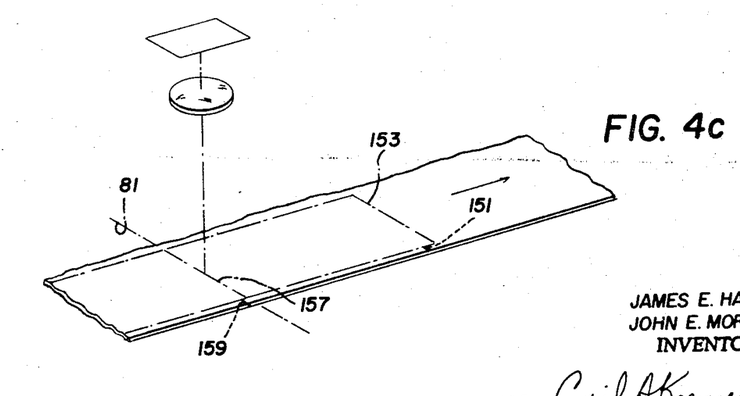

The exact operation of the system may be more clearly understood by reference to FIG. 4 which depicts the various stages of advance of the print paper in a vertical direction. In FIG. 4A, the top line of the print area is placed in alignment with the horizontal optical center line 81. At this juncture a cut mark 151 may be placed on the edge of the paper to facilitate subsequent cutting of the prints. Then, for example, the motor 91 and the magnetic clutch 98 associated with drum 93 may be energized which results in the rotation of the shaft 87 until such time as the arm 96 contacts the switch 105 which is effective to energize the brake clutch 89, turn off the motor 91 and release the clutch 98. This rotation of the shaft 87 has moved the print paper so that the top edge 153 has been moved vertically one-half the distance of the print length so that the entire print area 155 is centered about the horizontal optical center line 81 as shown in FIG. 4B. At this juncture the print paper is exposed by projecting the light from the light source through the transparency on the lens system onto the print area 155. Upon completion of the print exposure, the motor 91 and the magnetic clutch 99 associated with the drum 95 are energized which will again result in the movement of the print paper one-half of the vertical print length as shown in FIG. 4C, resulting in the bottom edge of the exposed print area 157 lying on the horizontal optical center line 81, which coincides with the top edge of the next print to be taken. At this juncture another cut mark 159 is made on the print paper, and if desired the size of the print area can be changed by manipulation of the knob 119 before the next advance takes place for the exposure of the subsequent prints. It can be readily seen that prior to the setting of any print sizes, the leading edge of the subsequent print always lies along the horizontal optical center line.

Figure 5:
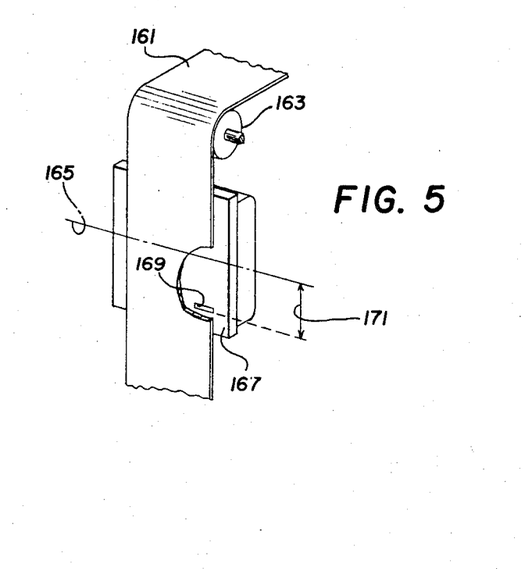
FIG. 5 is a partial perspective view of apparatus according to the invention illustrating the location of a paper marking slot with respect to the horizontal optical centerline of the apparatus.

To better understand how the advance mechanism of the present invention facilitates the placing of cut marks along the vertical edges of the print paper, reference is made to FIG. 5 wherein there is shown the print material 161 moving in the direction indicated over the drive roller 163. The print paper is cut away to show a substantial portion of the platen 167 and the horizontal optical center line of the system 165. The horizontal and vertical border masks are not shown, but would normally be in the system. A slot 169 is located slightly below the horizontal optical center line 165 and this slot provides an opening for a marker such as a disc marker to be selectively pressed against the back side of the print paper 161. The marking is accomplished at the time that the leading edge of the print to be made is in alignment with the horizontal optical center line 165. Therefore, the distance 171 between the horizontal optical center line and the slot 169 is constant regardless of the print dimension, so that as the print paper is later fed into a cutting machine, the cuts are always made a predetermined distance away from the print mark on the back of the print paper. While the composing screen is not shown in FIG. 5, it is preferable that during the marking operation the composing screen be moved up in position over the slot opening to provide a backing for the print material, thereby resulting in a more uniform and legible mark on the back of the print paper.

Figure 6:
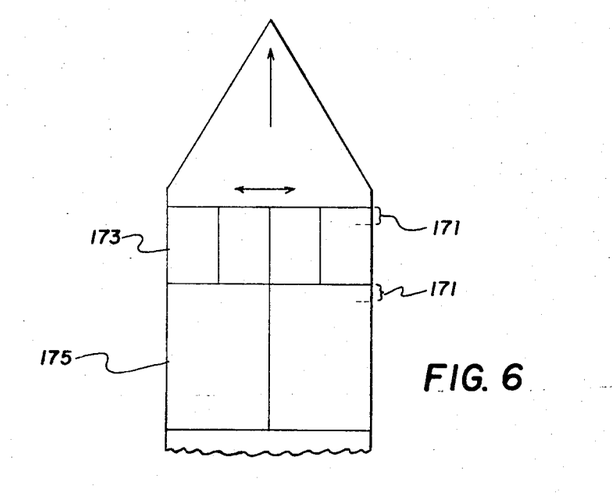
FIG. 6 is a diagrammatic representation of two rows of print exposures of differing dimensions.

In addition to providing control over the print material as it moved in a vertical direction, control is also desirable as the paper is moved in the horizontal direction. For example, as depicted in FIG. 6, it may be desirable to first print a row 173 of four equal sized prints and then print a row 175 of two prints of differing size. For example, if 16 inch wide print paper is used, the first row of print 173 might be 4 × 5 inch prints and the second row 175 could be 8 × 10 inch prints. It will be readily apparent to those skilled in the art that the apparatus described functionally in FIG. 3 for controlling movement in the vertical direction could be easily modified to similarly control movement of the print paper in a horizontal direction. On the other hand there are certain aspects of movement in the vertical direction which differ from movement in the horizontal direction. For example, the width of the paper is relatively small when compared to the overall length of the paper paper row so that some means for detecting the end of the paper width must be available. Also, in general it would not be desirable to change the print size for each row of prints in a horizontal direction. In this regard the mechanisms for controlling motion in the vertical direction may be somewhat simpler than those required to control the advance in the horizontal direction.

Figure 7:
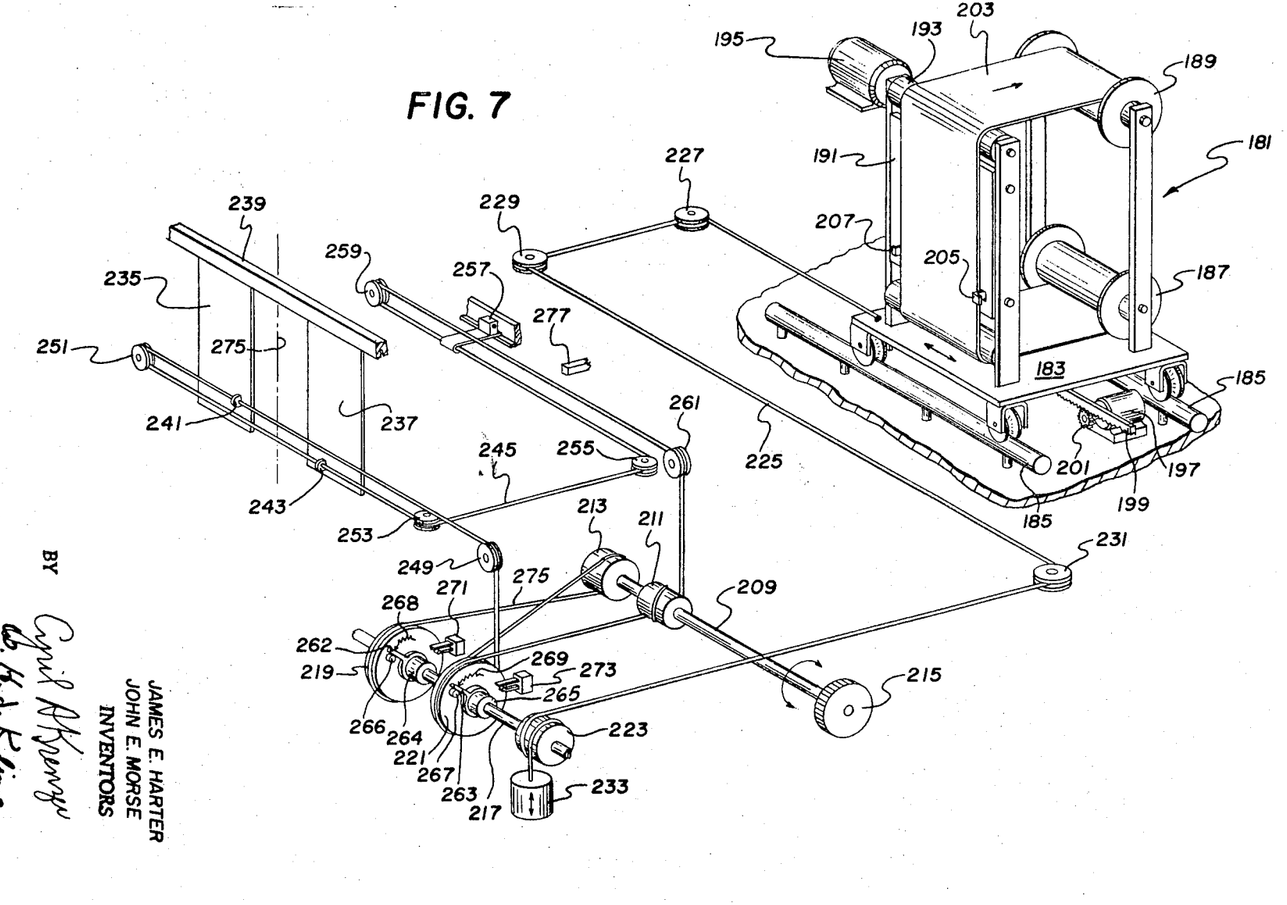
FIG. 7 is a segmental view in perspective of the lateral movement control apparatus in according with one embodiment of the present invention.

One system which provides these capabilities in the horizontal direction is shown in FIG. 7. The paper transport assembly indicated generally at 181 includes a base 183 mounted on rollers on two guide rails 185. On the base are mounted the supply spool 187, the take-up spool 189, the vacuum platen 191, a drive roller 193, a drive motor 195 and a transport drive motor 197 which is connected to a rack gear 199 and a pinion gear 201. The drive motor 195 and the drive roller 193 are obviously simplified versions of the vertical drive mechanisms shown and described in conjunction with FIG. 3, and are shown here only to provide functional completeness of the Figure. Mounted on either side of the paper 203 as it passes over the vacuum platen 191 are first and second actuator switches 205 and 207, respectively. The switch 205 is adjusted after the paper is mounted in the system to indicate the beginning edge of the print paper and switch 207 is moved approximately to the opposite edge of the paper to indicate the edge of the paper width.

The drive control mechanism includes a shaft 209 having fixedly mounted thereon two drive drums 211 and 213, and attached to one end of the shaft is a control or adjustment knob 215. A second shaft 217 suitably mounted within the system has loosely mounted thereon first and second drive control mechanisms 219 and 221. Firmly affixed to one end of the shaft 217 is a drum 223. A first cable 225 is connected to the transport assembly 181, passes around guides 227, 229, and 231 over and around the drum 223 and is connected to a weight 233. The vertical border control masks 235 and 237 are mounted in a slide 239 and are affixed by means of clamps 241 and 243, respectively, to a second control cable 245 which is an endless cable. Cable 245 passes around the drum 211 over to and around the drum 221, thence to guide 249 over to and through the clamp 241 connected to the mask 235, around a guide 251 to the second clamp 243 affixed to the mask 237, around guides 253 and 255 to and through a switch 257, passes around another guide 259 and returns to the drum 211 via a guide 261. A third cable 275 interconnects drive drum 213 with the drum 219. The drums 219 and 221 are equivalent to the drums 93 and 95 of FIG. 3, each including an arm 262,263, a clutch mechanism 264,265 a stop 266,267 and biasing means 268,269. Also located proximate each of the drums are switches 271 and 273, respectively. The operation of the apparatus of FIG. 7 is similar in many respects to the operation of the apparatus controlling the vertical advance as described in conjunction with FIG. 3. The knob 215 controls the setting of the opening between the vertical masks 235 and 237. If the knob is turned in a clockwise direction, the spacing between the masks is increased and is decreased if the knob is turned in a counterclockwise direction. At the same time by way of the action of the drums 211 and 213, the drive control drum mechanisms 219 and 221 are adjusted through the turning of the knob at 215. As the shaft 209 is rotated in a clockwise direction, the stops 266,267 are displaced by a greater angle from the switches 271 and 273, respectively. Once the spacing of the vertical mask has been effected, then the drums 219 and 221 control the lateral motion of the transport assembly 181. In the preferred embodiment as shown, the radius of the drum 211 is one-half the radius of the drum 213, so that drum 221 will advance the transport mechanism only one-half the distance it is transported via control of the drum 219. The transport assembly 181 is driven in a lateral direction by the motor 197 via the rack and pinion gears 199 and 201, respectively. To initiate the lateral motion, the right-hand edge of the print paper is moved until it lies in alignment with the vertical optical center line 275 of the apparatus. This is sensed by the switch actuator 205 making contact with a switch 277 suitably mounted in the structure. Once the right edge of the print paper is in alignment with the vertical optical center line, the border controls and print sizes can be adjusted by the manipulation of the knob 215 as explained above. At this juncture the motor 197 is actuated which in turn activates the magnetic clutch 265 associated with the drum 221. The motor via the rack and pinion gear moves the transport assembly 181 to the right thereby imparting motion also to the cable 225 which causes rotation of the shaft 217. The shaft rotates until the arm 2 263 on the drum 221 contacts the switch 273, which deactivates the motor 197. At this point the center of the print area to be exposed will be in alignment with the vertical optical centerline 275 of the apparatus. Thus it can be seen that the activation of the motor and energization of the drum control 221 has moved the paper a distance approximating one-half of the print area to be exposed. Once the print has been exposed, the drive motor is again activated and this time the drum 219 has its magnetic clutch 264 energized. This drum is configured via its control drum 213 to advance the paper a full print width to the right before deenergization of the drive motor 197. Therefore in this embodiment once the print size has been determined for a lateral row of prints, only the first paper advance is a one-half advance; thereafter all of the advances are the full paper width and correspond to a full exposure.

The step by step advances of the transport assembly 181 to the right continue until such time as the switch 257 makes contact with the switch actuator 207. At this juncture the machine recognizes that there is insufficient paper width remaining in that row to yield another print, whereby the motor 197 is energized to return the transport assembly to the left direction until the switch 205 contacts the stop 277. Then the motor 197 is deactivated and the vertical advance system is energized as described in FIG. 3 to advance the paper to the next row for set-up and subsequent exposure of the prints.

The foregoing discussion has been concerned primarily with the situation where no border has been introduced onto the finished print. For an understanding of how border dimensions can be added to a print, reference is made to aforementioned copending application Ser. No. 181,686, filed Sept. 20, 1971, entitled, "Print Border Control Apparatus" commonly assigned to Eastman Kodak Company.

The invention has been described in detail with particular reference to preferred embodiments thereof, but it will be understood that variations and modifications can be effected within the spirit and scope of the invention.

We claim:

1. In an apparatus having means for forming images in a copy plane at varying magnifications, said copy plane including a reference center line, an improved transport mechanism for moving copy material in said plane, comprising:

first positioning means operative to move the trailing edge of said area of material having an image formed thereon to said reference line;

second positioning means operative to move said copy material into position centered on said reference line for forming of a second image; and control means for adjusting the first and second positioning means so as to regulate the movement of the copy material in accordance with the varying magnifications.

2. The invention according to claim 1, wherein said first and second positioning means move the copy material in a first direction, and additionally comprising:

third positioning means operative to move said copy material in a second direction perpendicular to said first direction to thereby permit formation of a sequence of images on said copy material in said second direction.

3. The invention according to claim 2 additionally comprising means for sensing the boundaries of said copy material in said second direction.

4. The invention according to claim 1 additionally comprising means for marking said copy material when the trailing edge of said first area of material having an image formed thereon is positioned coincident with said reference line.

5. In photographic printing apparatus including a print plane adapted to have photographic paper moved thereover, a transparency holder, a light source adapted to be projected through said transparency to expose the photographic paper, and a lens system interposed between said transparency and said print plane and operative to focus the image of said transparency on said print plane at varying magnifications, the improvement comprising:

means adapted to provide a supply of photographic printing paper;

take-up means adapted to receive said photographic printing paper;

means for threading said photographic print paper from said supply means over said print plane to said take-up means;

first positioning means operative to position the edge of the print area to be exposed on the optical center line of said print plane;

second positioning means operative to move said print paper so that the edge of said print material has moved to a position whereby the center of the print area to be exposed lies along said optical center line;

means for exposing an image of said transparency on said print paper; and means for moving said print paper so that the bottom edge of said exposed print area is positioned at said optical center line of said print paper.

6. The invention according to claim 5 additionally comprising means for varying the size of said print area to be exposed and regulating the movement of said print paper in accordance with the varying of the size of said print area.

7. The invention according to claim 5 additionally comprising marking means operative to mark the back side of said print paper when the bottom edge of said paper area is positioned at the optical center line of said print paper.

8. In photographic printing apparatus including a print plane adapted to receive a photographic paper for printing, a transparency holder and a light source adapted to be directed through a film transparency in the holder for projection onto the print plane and lens apparatus interposed between said transparency holder and said print plane and operative to focus the image of said transparency on said print plane, a method for printing photographic film comprising the steps of:

adjusting the amount of advancement for said print paper so as to be in accordance with the desired print size;

positioning the top edge of the print area on the print paper to be exposed on a first optical center line in said print plane;

positioning a first side edge of said print paper on a second optical center line, perpendicular to said first optical center line;

advancing the top of said print paper until the center of said print area lies along said first optical center line;

moving the the first side of said paper until the center of said print area lies along the second optical center line of said apparatus;

exposing the transparency by projecting the light from said light source through said transparency and said lens apparatus onto the print paper;

advancing the top of said print paper until the bottom of said print paper lies along said first optical center line; and re-adjusting the dimensions of said print paper advance mechanisms for subsequent prints to be made.

9. In the method according to claim 8 after the step of exposing the photographic print, the additional steps comprising:

moving the photographic paper in a lateral direction to position a second print area of said photographic paper in place for exposing;

exposing said transparency through said lens system onto said second area of the photographic print paper; and repeating the above steps until the lateral dimension of the photographic paper has been fully utilized.

10. In the method according to claim 8, after the step of advancing the top of said print paper until the bottom of said print paper lies along said first optical center line, the additional step of marking the back side of print paper with a reference mark to facilitate subsequent cutting of the print paper.

* * * * *